(12) United States Patent
Broadhead

(10) Patent No.: US 6,637,589 B2
(45) Date of Patent: Oct. 28, 2003

(54) LOCKABLE BOX

(76) Inventor: Robert Malcolm Broadhead, 14921 Applegate Rd., Grants Pass, OR (US) 97527

( * ) Notice: Subject to any disclaimer, the term of this patent is extended or adjusted under 35 U.S.C. 154(b) by 17 days.

(21) Appl. No.: 09/896,673

(22) Filed: Jun. 29, 2001

(65) Prior Publication Data

US 2003/0000852 A1 Jan. 2, 2003

(51) Int. Cl.[7] .............................................. B65D 85/67
(52) U.S. Cl. ......................... 206/308.2; 206/387.11; 206/308.1; 70/57.1
(58) Field of Search ........................... 206/308.2, 308.1, 206/387.11, 307, 1.5, 309, 807; 70/63, 57.1, 58

(56) References Cited

U.S. PATENT DOCUMENTS

| 5,209,086 | A | * | 5/1993 | Bruhwiler | 70/57.1 |
|---|---|---|---|---|---|
| 5,253,751 | A | * | 10/1993 | Wipper | 206/756 |
| 5,524,752 | A | * | 6/1996 | Mazzucchelli | 206/308.2 |
| 5,718,332 | A | * | 2/1998 | Tachibana | 206/308.2 |
| 5,782,350 | A | * | 7/1998 | Weisburn et al. | 206/308.2 |
| 5,894,924 | A | * | 4/1999 | Koch | 206/310 |
| 5,901,840 | A | * | 5/1999 | Nakasuji | 206/1.5 |
| 6,076,667 | A | * | 6/2000 | Ambrus | 206/308.2 |

* cited by examiner

Primary Examiner—J. Mohandesi
(74) Attorney, Agent, or Firm—Charles D. Gunter, Jr.

(57) ABSTRACT

A lockable box (2) for a DVD or other disc has at least two releasably interengageable locking members (10,20) (110, 120) which, when interengaged, prevent the box from being opened. The locking members are entirely contained within the box when the box is closed, and they can be disengaged only with the use of a special tool.

19 Claims, 3 Drawing Sheets

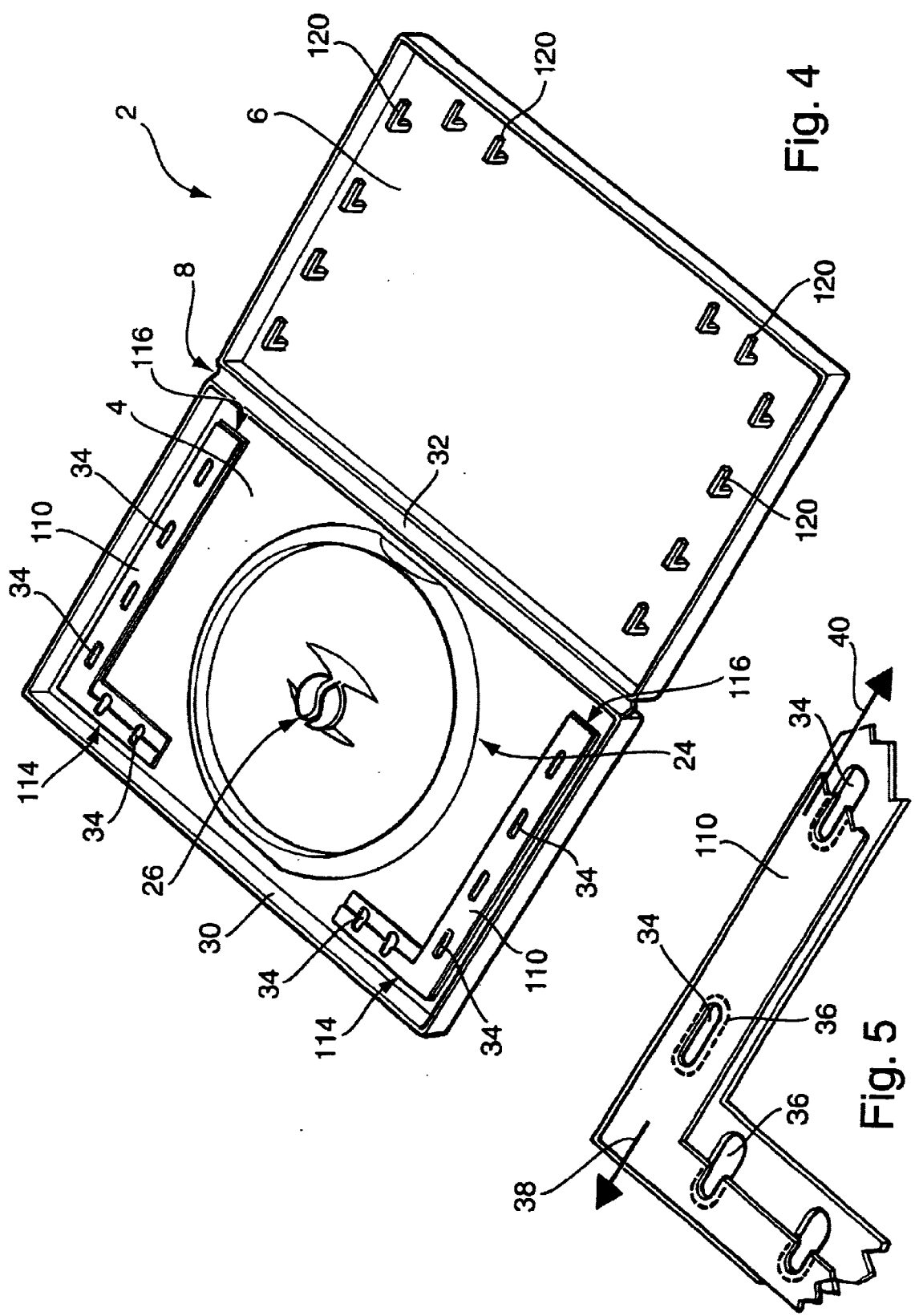

LOCKABLE BOX

FIELD OF THE INVENTION

The present invention relates to a lockable box for pre-recorded media, notably a DVD box.

BACKGROUND TO THE INVENTION

Pre-recorded storage media such as digital versatile discs (DVDs) are usually put up for sale in a plastic box which carries information about the DVD as well as carrying sales promotional material or artwork to attract a purchaser. To prevent theft of the DVD from a store various lockable display containers have been proposed which house the DVD in its box and prevent a thief gaining access to the DVD without breaking the container or removing the container from the shop. The container can be fitted with alarm means so that it cannot be removed from the shop without actuating an alarm. Examples of such lockable containers are described in EP 0 312 172, EP 0 541 733, EP 0 666 954 and WO 00/61899. These display containers are effective but they increase the bulk of the product on display.

Known products provide a locking member which is externally applied to the box. With such products, the box cannot be shrink-wrapped for "sell-through", as there is then no means of removing the locking member without damaging the packaging. The locking members are also subject to being tampered with. Once the locking member has been removed in order to unlock the box (in a rental situation) it has to be safely stored for re-use later on. If the locking member is lost, the box can no longer be secured.

The present invention seeks to provide an improved lockable disc box.

SUMMARY OF THE INVENTION

The present invention provides a lockable box for a DVD or other pre-recorded data carrier. The box has at least two releasably interengageable locking members which, when interengaged, prevent the box from being opened. The locking members are entirely contained within the box when the box is closed, and they can be disengaged only with the use of a special tool.

It is preferred that the box is a DVD box, and the invention will be described with reference to this embodiment. However, it will be understood that the invention is also applicable to other pre-recorded data carriers, for example compact discs (CDs), videos and tape cassettes.

The DVD box may be supplied to Record Label and Film Studio Companies as original packaging, filled with product and then sent to a retailer in either a locked or an unlocked state.

Unlike existing products, which require a manual action to insert (lock) or remove (unlock) the locking member, the disc box of the present invention can be locked and unlocked in a hands-free manner. By incorporating a ferrous element in a movable locking member, the box may be locked and unlocked by swiping it against a suitable strong magnet.

The box comprises a first box member and a second box member which are adjustable between a closed position in which they co-operate to define a substantially closed box, and an open position in which the inside of the box is accessible to permit a disc to be inserted into or removed from the box. Each box member has a locking member, and at least one of the locking members is adjustable between a locked position in which, when the box members are in the closed position, the locking members interengage so as to prevent the box from being opened, and an unlocked position in which the locking members permit the box members to be moved from the closed position to the open position. The two co-operating locking members comprise a locking mechanism.

The locking member on each box member could be movable relative to the box member. However it is preferred that one locking member is movable and the other is fixed relative to its box member. In a preferred embodiment, the movable locking member is pivotable between the locked and unlocked positions.

One of the locking members may be provided with a hole or recess in which the other locking member is disposed when the box is locked.

In another preferred embodiment, the movable locking member is slidable between the locked and unlocked positions. By providing each end of the slidable locking member with a ferrous element, locking and unlocking may be carried out means of a single swipe along an appropriate edge of the box.

Although the invention may employ only one locking mechanism, it is preferred that more than one locking mechanism, preferably two locking mechanisms, are provided. This preferred embodiment permits all three free edges of a conventional hinged DVD box to be locked.

In the preferred embodiment where one locking member of a pair is fixed and the other is movable, both movable locking members may conveniently be provided on the same box member. However, it would also be possible to provide one movable locking member on each box member.

The interior of the box may be provided with an electronic tag of a type known per se which activates an alarm system if an attempt is made to remove the DVD box from the store. It is particularly preferred that the tag (3 in FIG. 2) may be remotely deactivated by electronic means. This permits the DVD box to be sold in shrink wrapping (5 in FIG. 2) and to be both unlocked and alarm-deactivated at the point of sale without removing the wrapping. Suitable electronic tags are known in the art.

Other aspects and benefits of the invention will appear in the following specification, drawings and claims.

BRIEF DESCRIPTION OF THE DRAWINGS

The invention will now be further described, by way of example, with reference to the following drawings in which:

FIG. 4 shows a second embodiment of a lockable DVD box in accordance with the invention; and FIG. 5 is a fragmentary view of part of the locking mechanism of the DVD box shown in FIG. 4.

DETAILED DESCRIPTION

Figure 1:
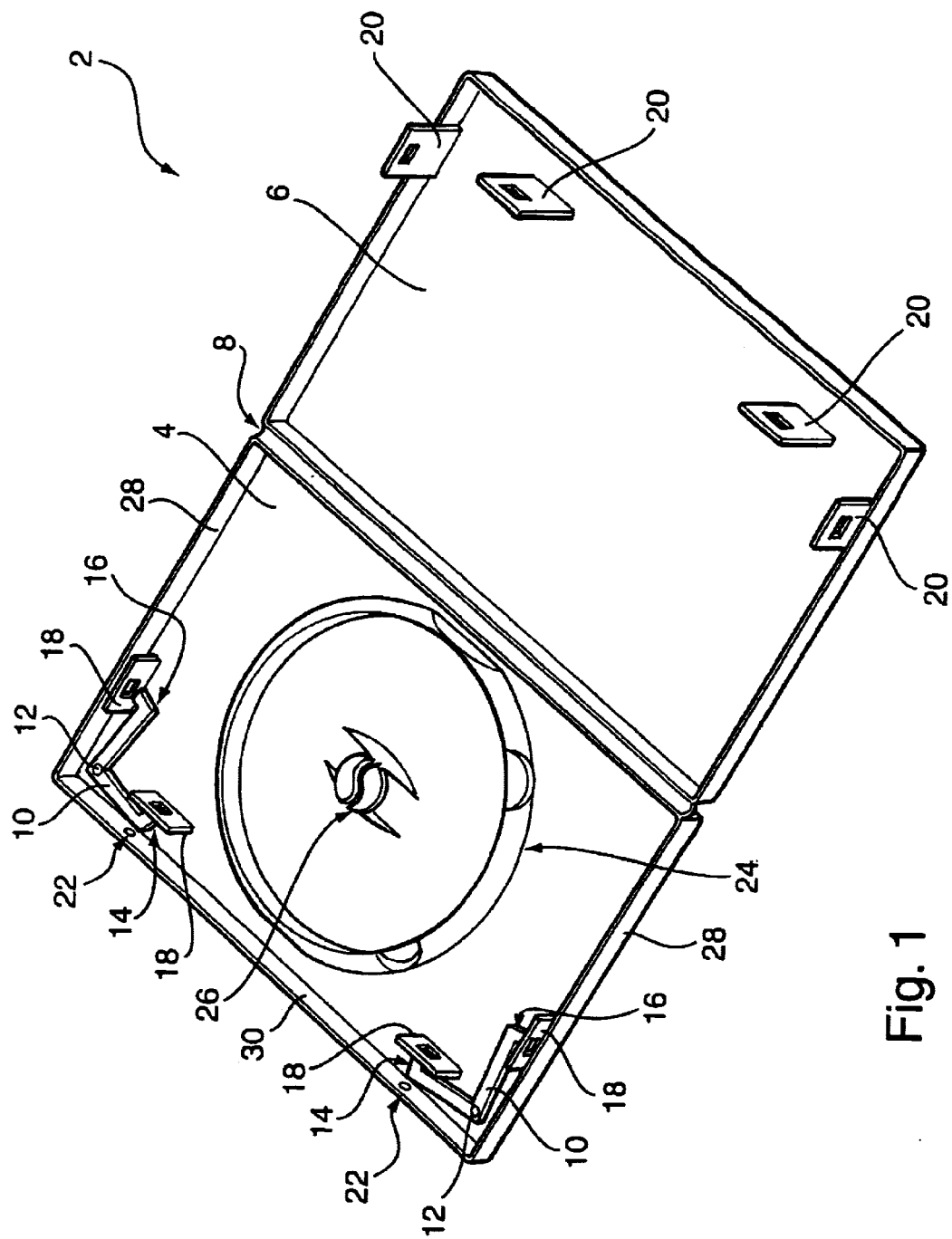
FIG. 1 shows a first embodiment of a lockable DVD box in accordance with the invention.

The DVD box 2 comprises a first box member 4 and a second box member 6 connected together by a hinge 8. The box members 4,6 are hollow shells, for example of polypropylene, which co-operate to form a closed box when pivoted about the hinge 8 in known manner. The first box member 4 is provided with an annular disc-receiving member 24 with a resilient mount 26 in the middle, for releasably securing a DVD (not shown) as is well known in the art. The disc-receiving member 24 and mount 26 could additionally or alternatively be provided on the second box member 6. Each box member has a pair of parallel short edges 28 and a pair of opposing parallel long edges 30.

Two locking members 10 are pivotally mounted on the inner surface of the first box member 4 by means of pivot pins 12. The tension between the pivot pin 12 and its locking member 10 is such that the locking member 10 cannot be pivoted by shaking of the box; a greater force is required.

Figure 2:
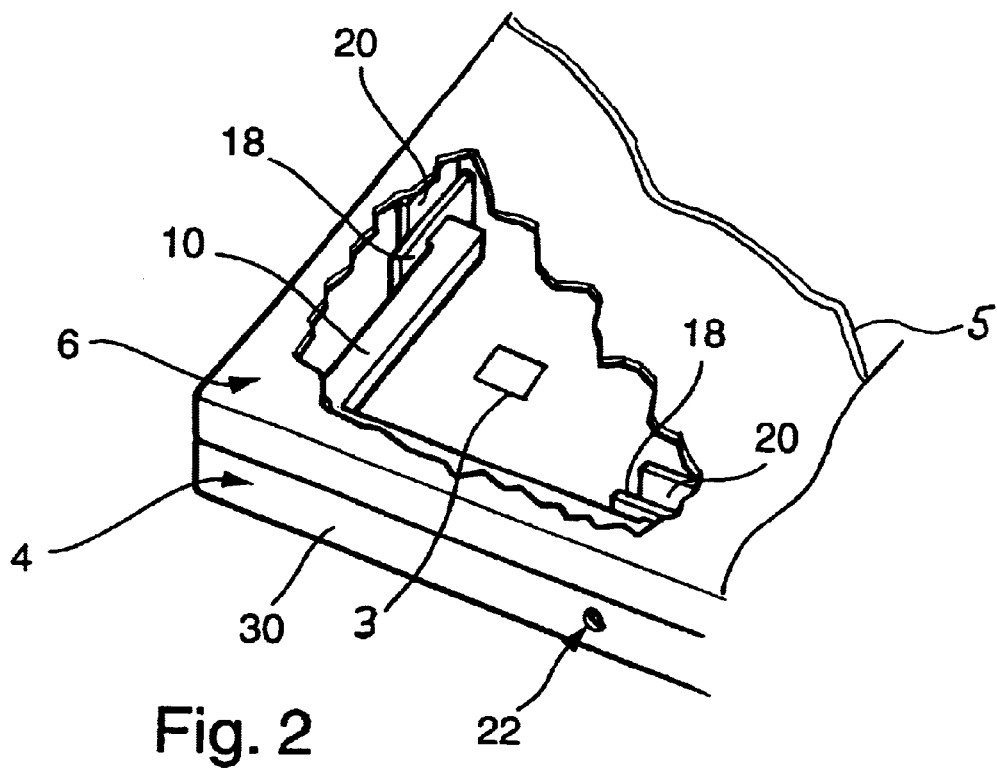
FIG. 2 is a fragmentary cutaway view of part of the box shown in FIG. 1, with the box closed and locked.
Figure 3:
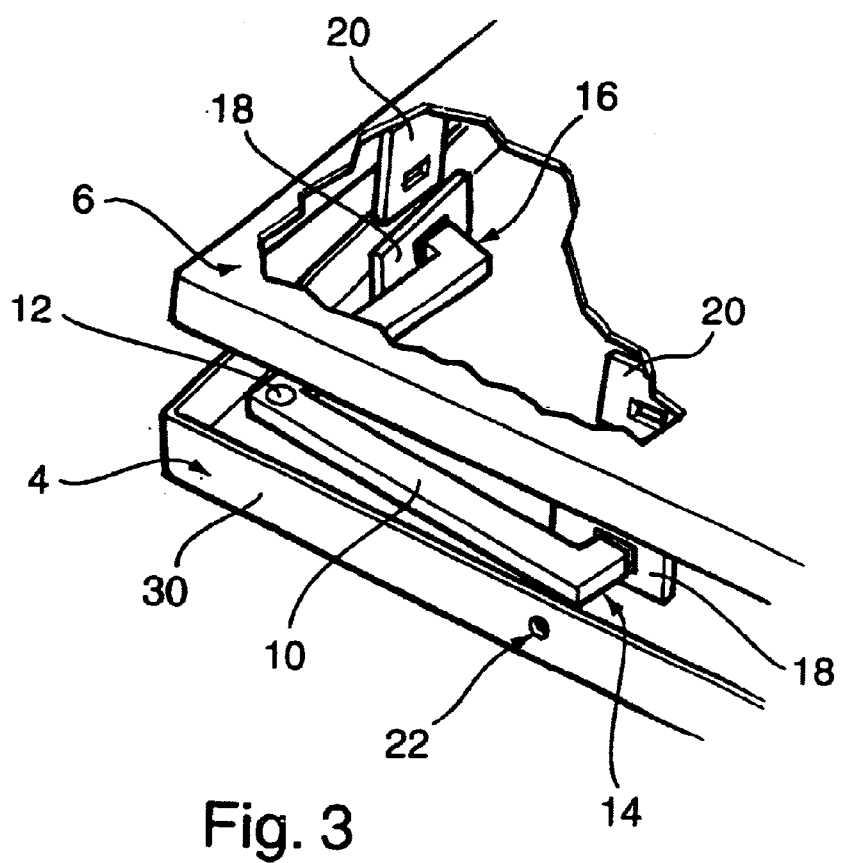
FIG. 3 is a fragmentary cutaway view similar to that of FIG. 2, with the box unlocked and partially open.

Upstanding lugs 18 are provided on the inner surface of the first box member 4 adjacent the distal ends 14 and proximal ends 16 of the pivotable locking members 10. The second box member 6 is provided with locking members comprising upstanding lugs 20 on the inner surface. Each upstanding lug 18, 20 has a hole, and when the box 2 is closed pairs of lugs 18, 20 are located face to face with the holes in alignment. The arrangement is such that, with the box members 4, 6 in the closed position, pivoting of the locking member 10 from the unlocked position shown in FIG. 3 to the locked position shown in FIG. 2 brings the ends 14, 16 into disposition through the holes in both the aligned lugs 18, 20 in the pair. In this position, the box members 4, 6 are locked together.

With the box 2 closed, the locking members 10 are pivotable only with the use of a special tool. It is preferred that the proximal 14 and distal 16 ends of the locking member 10 are formed from a ferrous material or are provided with a ferrous insert or attachment. This permits the locking member 10 to be pivoted by means of a strong external magnet device. A suitable magnetic device is described in WO 00/61899.

To lock the box, the box is closed, and then each short edge 28 is swiped in turn against the magnet. The magnet attracts the ferrous insert of the distal end 16, causing the locking member 10 to pivot and both ends to engage in holes in the associated pair of lugs 18, 20.

To unlock the box, the long edge 30 is swiped against the magnet so that the magnet attracts the distal ends 14 of the locking members 10 and reverses the locking process.

In practice, the magnet may be mounted on a checkout desk at the point of sale or rental.

Although the above arrangement is preferred for ease of unlocking, it will be appreciated that the opposite arrangement could also be used, whereby locking is achieved by a single swipe along the long edge of the box, and unlocking by a swipe along both short edges.

In an alternative embodiment, the locking member 10 could be accessible via a hole 22 in an edge of the box. As illustrated in the drawings, the box could be locked by a user inserting a long thin tool through the hole 22 in the long edge 30 so as to push the proximal end 14 and cause the locking member 10 to pivot to the locked position. It would be possible for unlocking to be carried out by the same tool through a similar hole adjacent to the distal end 16 of the locking member 10. However it is preferred that exclusively magnetic means are used for unlocking and, preferably, for locking, the box because the use of a suitable magnet is quicker and permits the DVD box to be locked and unlocked while shrouded in shrink-wrap material.

In another embodiment, the proximal ends 14 are provided with permanent magnets with like poles facing towards the long edge 30. This permits the box to be locked with a single swipe of a suitable magnet with a like pole adjacent the long edge 30 so that the permanent magnets in the proximal ends 14 are repelled. The box can be unlocked with a single swipe of a suitable magnet with the opposite polarity adjacent the long edge. Both types of magnets could be mounted at the point of sale or rental, one for locking and the other for unlocking.

It would be possible not to provide the lugs 18 on the first box member 4 so that the locking member 10 engages only with the lugs 20 on the second box member 6 when the box is locked. However, this would require the locking member 10 to be relatively rugged and robust because it would need to resist upward force exerted by an attempt to prise the box members apart. In the preferred embodiment the ends of the locking members are disposed through lugs on both the first box member 4 and the second box member 6, so that the lugs 18 on the first box member 4 prevent force from the second box member 6 being transmitted to the pivot pin 12.

The entire locking member 10 and its mount may be provided as a removable insert to enable its removal either at point of sale or by a customer. Alternatively, the pivot pin 12 could be made releasable by exerting an upward force on the pivotable locking member 10.

Referring now to FIGS. 4 and 5, an alternative embodiment of the invention employs a locking member 110 which is slidably mounted on the first box member 4. The second box member 6 is provided with a plurality of fixed locking members comprising upstanding L-shaped hooks 120. For each hook 120 there is a corresponding hole 34 in the slidable locking member 110. Under each hole 34 there is a space 36, as best shown in FIG. 5, for receiving a corresponding hook 120. The proximal 114 and distal 116 ends of both slidable locking members 110 are provided with ferrous inserts (not shown) so that they are attractable by a magnet. By swiping a first long edge 30 of the box against a suitable magnet, the slidable locking member moves in the direction of arrow 38 to an unlocked position in which the hooks 120 can enter and leave the spaces 36 via the holes 34. With the box 2 in the closed position and the slidable locking member 110 in the unlocked position, the box 2 may be locked by swiping the opposite long edge 32 against a magnet so as to move the slidable locking member 110 to the locked position in the direction of arrow 40. Here, the hooks 120 are trapped in the slidable locking member 110, and the box is locked.

In this embodiment, the DVD box 2 can be locked and unlocked with a single swipe against a suitable magnet along the appropriate edge.

In both embodiments, the locking members 20, 120 on the inner surface which does not carry the mount 26 for the DVD (in these examples, the second box member 6) are arranged to as to permit literature pertaining to the DVD to be inserted and removed. One or more clips (not shown) may be provided on the inner surface of the second box member 6 to releasably retain such literature, in a manner well known in the art.

While the present invention has been described with reference to specific embodiments, it should be understood that modifications and variations of the invention may be constructed without departing from the scope of the invention defined in the following claims.

I claim:

1. A lockable box for a pre-recorded data carrier in the form of a disc, the box comprising:
   a first box member and a second box member, each box member having a pair of parallel short edges and a pair of opposing parallel long edges, the box members being adjustable between a closed position in which they cooperate to define a substantially closed box with a closed interior, and an open position in which the inside of the box is accessible to permit a pre-recorded data carrier to be inserted into or removed from the box;

at least one of the box members being provided with a mount for releasably securing a disc thereon;

each box member having a locking member;

at least one of the locking members being adjustable between a locked position in which, when the box members are in the closed position, the locking members interengage so as to prevent the box from being opened, and an unlocked position in which the locking members permit the box members to be moved from the closed position to the open position; wherein the locking members are entirely contained within the box members when the box members are in the closed position so that the locking members do not extend past either the short or long edges of the box which define the closed interior, and the adjustment of the locking member to the unlocked position is achievable only with the use of a special tool.

2. A lockable box as claimed in claim 1, wherein the locking member on the first box member is movable relative to the first box member and the locking member on the second box member is fixed relative to the second box member.

3. A lockable box as claimed in claim 2, wherein the movable locking member is pivotable between the locked and unlocked positions.

4. A lockable box as claimed in claim 1, wherein at least a part of one of the locking members comprises a ferrous material whereby the said locking member can be adjusted between the locked and unlocked positions by means of a suitable magnet.

5. A lockable box as claimed in claim 4, which has at least two opposed edges, wherein the said locking members are adjustable to the locked position by swiping one edge along a suitable magnet and wherein the said locking members are adjustable to the unlocked position by swiping the opposite edge past a suitable magnet.

6. A lockable box as claimed in claim 1, wherein the first and second box members are each provided with two locking members.

7. A lockable box as claimed in claim 6, wherein two of the locking members are movable and two of the locking members are fixed.

8. A lockable box as claimed in claim 7, wherein both the locking members on the first box member are movable and both the locking members on the second box member are fixed.

9. A lockable box as claimed in claim 7, wherein at least a part of each movable locking member comprises a ferrous material whereby they can be adjusted between the locked and unlocked positions by means of a suitable magnet.

10. A lockable box as claimed in claim 9, wherein the said ferrous material is a permanent magnet and the magnets are arranged with like poles facing in substantially the same direction.

11. A lockable box for a pre-recorded data carrier in the form of a disc, the box comprising:

a first box member and a second box member which are adjustable between a closed position in which they cooperate to define a substantially closed box, and an open position in which the inside of the box is accessible to permit a pre-recorded data carrier to be inserted into or removed from the box;

at least one of the box members being provided with a mount for releasably securing a disc thereon;

each box member having a locking member;

at least one of the locking members being adjustable between a locked position in which, when the box members are in the closed position, the locking members interengage so as to prevent the box from being opened, and an unlocked position in which the locking members permit the box members to be moved from the closed position to the open position; wherein the locking members are entirely contained within the box members when the box members are in the closed position, and the adjustment of the locking member to the unlocked position is achievable only with the use of a special tool; and wherein the locking member on the first box member is movable relative to the first box member and the locking member on the second box member is fixed relative to the second box member; and wherein the fixed locking member on the second box member comprises an upright member which has a hole in which the movable locking member engages when adjusted to the locked position.

12. A lockable DVD box, comprising:

a first box member and a second box member, each box member having a pair of parallel short edges and a pair of opposing parallel long edges, the box members being adjustable between a closed position in which they cooperate to define a substantially closed box with a closed interior, and an open position in which the inside of the box is accessible to permit a DVD to be inserted into or removed from the box;

at least one of the box members being provided with a mount for releasably securing a DVD thereon;

the box being provided with two spaced apart releasable locking mechanisms, each comprising a locking member provided on the first box member and a locking member provided on the second box member;

at least one of each of the locking members in both locking mechanisms being adjustable between a locked position in which, when the box members are in the closed position, the locking members interengage so as to prevent the box from being opened, and an unlocked position in which the locking members disengage; wherein the locking members are entirely contained within the box members when the box members are in the closed position so that the locking members do not extend past either the short or long edges of the box which define the closed interior, and the adjustment of the locking members to the unlocked position is achievable only with the use of a special tool.

13. A lockable DVD box as claimed in claim 12, wherein the locking members on the first box member are movable and the locking members on the second box member are fixed.

14. A lockable DVD box as claimed in claim 13, wherein at least a part of each movable locking member comprises a ferrous material whereby they can be adjusted between the locked and unlocked positions by means of a suitable magnet.

15. A lockable DVD box as claimed in claim 12, wherein the adjustable locking members are pivotable between the locked and unlocked positions.

16. A lockable DVD box as claimed in claim 12, wherein both locking members have a ferrous insert or attachment which is a permanent magnet, the magnets being arranged with like poles facing in substantially the same direction, whereby the said locking members can be reversibly adjusted between the locked and unlocked positions by means of a suitably orientated magnet.

17. A lockable DVD box as claimed in claim 14, wherein:
  the box members have two opposed long edges and are connected together by a hinge along one of the long edges; and
  the locking members are arranged so that they are adjustable from the locked position to the unlocked position by swiping one of the said long edges of the box past a suitable magnet.

18. A lockable DVD box as claimed in claim 12, further including a DVD mounted on the said mount and the box being shrouded in a shrink-wrap material.

19. A lockable DVD box as claimed in claim 18, further including a remotely-deactivatable alarm tag within the box.

* * * * *